April 22, 1969  T. W. HENNESSEY  3,440,463
SPRING BRAKE FOR SAW MOTOR
Filed Jan. 13, 1967

INVENTOR
TIMOTHY W. HENNESSEY,

MELVILLE, STRASSER, FOSTER, HOFFMAN,
ATTORNEYS.

United States Patent Office 3,440,463
Patented Apr. 22, 1969

3,440,463
SPRING BRAKE FOR SAW MOTOR
Timothy W. Hennessey, Springfield, Ohio, assignor to Robbins & Myers, Inc., Springfield, Ohio, a corporation of Ohio
Filed Jan. 13, 1967, Ser. No. 609,196
Int. Cl. H02k 7/102
U.S. Cl. 310—77        6 Claims

ABSTRACT OF THE DISCLOSURE

A spring brake for a saw motor wherein a spring embraces the motor shaft and a sleeve rotatable on the motor shaft, the sleeve being of slightly smaller diameter than the motor shaft and elastic means for stopping rotation of the sleeve when the motor is deenergized so that friction between the spring and the sleeve slows the motor down rapidly but without an abrupt jerk.

Background of the invention

The field of the invention is spring brakes for electric motors which have for their purpose to slow down and stop the shaft of an electric motor when the supply of current to the motor is cut off.

Various kinds of spring brakes have been provided for gradually slowing down a deenergized electric motor. The various types of spring brakes heretofore provided have been found unsatisfactory where they are to be used to slow down and stop the motor driving a circular saw, such as, for example, a radial arm saw. In such saws, the blade generally operates at a speed of say 3600 r.p.m. and when a ten inch diameter saw blade is mounted on such a motor shaft, it normally takes from two and a half to three and a half minutes from the time the motor is switched off until the motor shaft with the saw blade thereon comes to rest. During this time of course the rotating saw blade constitutes a threat to the safety of the operator. It is desirable to slow the saw blade down to a full stop in five to ten seconds. It is impossible to stop it instantaneously because of the risk of damage to the motor assembly and the possible detachment of the rotating saw blade from the motor shaft.

Summary of the invention

According to the present invention, the motor shaft has a portion of reduced diameter on which a sleeve is rotatably mounted. The sleeve has a slightly smaller outside diameter than the adjacent motor shaft and a flat helical spring wound to a smaller diameter than the motor shaft embraces the unreduced portion of the shaft and the sleeve, and since the spring is under tension, it grips both the shaft and the sleeve so that when the motor is running, the sleeve rotates as a unit with the motor shaft. The direction of wind of the spring is such in relation to the direction of rotation of the motor that if the sleeve is held from rotation the motor can continue to rotate without tightening the spring.

Means are provided for stopping rotation of the sleeve which means include a resilient element to take up the shock of an abrupt stopping of the sleeve, and an actuator device is provided to stop rotation of the sleeve. The actuator device is arranged so that it comes into play in a fraction of the time required for the motor shaft to make a single revolution.

Description of the preferred embodiment

Figure 1:
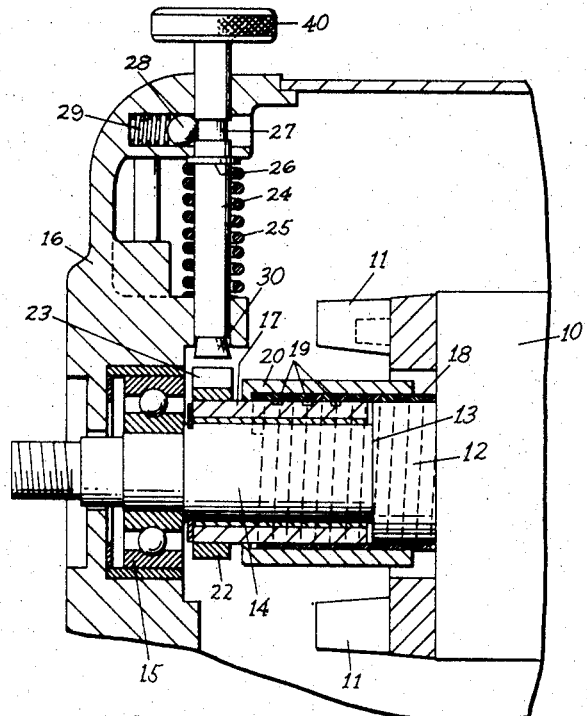
FIG. 1 is a fragmentary vertical axial cross sectional view through an electric motor equipped with the device of the invention, in the condition in which the motor is running.
Figure 3:
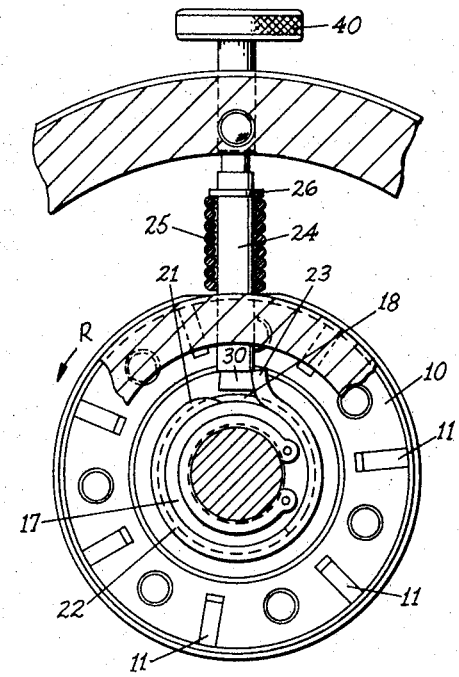
FIG. 3 is a cross sectional view taken on the line 3—3 of FIG. 2.
Figure 2:
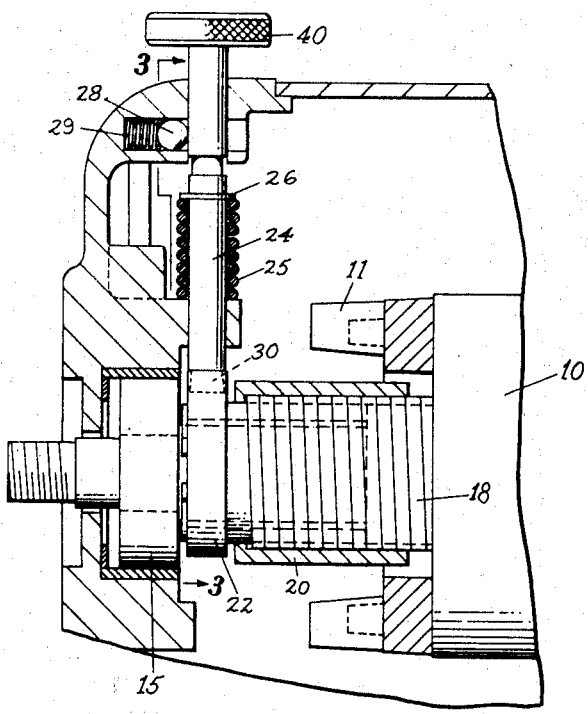
FIG. 2 is a view similar to FIG. 1 with the actuator depressed to stop rotation of the sleeve and initiate the slow-down of the motor.

In FIGS. 1 and 2 the rotor of the motor is indicated generally at 10 and it may be provided with the usual fan blades 11. The rotor is mounted on the shaft 12 which is provided with the shoulder 13 and a portion of reduced diameter 14. 15 indicates the usual ball bearing with which the motor is equipped and which is mounted in the end bell 16. A sleeve 17 (and it may be a composite sleeve as shown in the drawing) is mounted on the portion 14 of the shaft 12. The outside diameter of the sleeve 17 is slightly smaller than the outside diameter of the portion 12 of the shaft and a flat helical spring 18 embraces both the portion 12 of the motor shaft and the sleeve 17. The spring 18 is wound to a smaller diameter than the motor shaft and the sleeve. By way of example, the inside diameter of the spring 18 as wound and in relaxed condition may be nominally .84 inch. The outside diameter of the sleeve 17 may be nominally .856 inch and the outside diameter of the portion 12 of the shaft may be nominally .875 inch. It will thus be seen that when the spring 12 is mounted upon the shaft and sleeve as shown in the drawings, it is under tension and it therefore grips both the shaft portion 12 and the sleeve 17. Thus, if the direction of rotation of the rotor 10, as seen in FIG. 3, is in the direction of the arrow R, the spring 18 will be wound with a right-hand helix. Saying this in another way, if the sleeve 17, as seen in FIG. 3, is turned in a clockwise direction with the motor shaft fixed, slippage can occur between the sleeve 17 and the spring 18. Reversing the relationship, if the sleeve is held stationary and the shaft is rotated counterclockwise, slippage can occur. It must be noted that the slipping action between the sleeve and spring tends to loosen or unwind the spring. If the spring is wound in the wrong direction, then substantially instantaneous braking and an extremely high and probable damaging impact would occur. The sleeve is provided with lubricant grooves 19 as best seen in FIG. 1, and a high temperature non-melting grease should be used as a lubricant to insure smooth slipping action during braking. A grease shield is indicated at 20 to prevent loss of the lubricant as a result of centrifugal force when the saw motor is operating at its normal speed of say 3600 r.p.m.

Secured to the outboard end of the sleeve, as by welding at 21, is a substantially one turn spring 22 having an outturned end portion 23. The spring 22 is wound on the sleeve in the direction of rotation of the motor shaft as seen in FIG. 3, but it is secured to the sleeve only by the weld at 21.

The actuator comprises a pin 24 mounted in the end bell as shown in FIGS. 1 and 2, and having a compression spring 25 operating against a flange 26 on the pin 24 normally to urge the pin 24 upwardly. The pin 24 is provided with a neck 27 and a ball detent 28 provided with a spring 29 is adapted to seat in the neck 27 when the pin 24 is in its inoperative position as in FIG. 1. The pin may be provided with a suitable knob, as at 40, and at its lower end it has the engaging means 30 which preferably has a reverse chamfer as shown.

When the saw motor has been deenergized and it is desired to stop the rotation of the motor shaft and saw blade, pressure is exerted on the knob 40. The relationship of the forces of the springs 25 and 29 is such that the effort necessary to produce disengagement from the ball detent 28 is sufficient to give the pin 24 a downward movement at such speed that the chamfered engaging element 30 comes into the path of the outturned finger 23 of the spring 22 in substantially less time than is required for a complete revolution of the motor shaft, i.e. in substantially less than one-sixtieth of a second.

When the pin 24 has been pushed down to its actuating position shown in FIGS. 2 and 3, the upturned finger 23 of the spring 22 engages the reversely chamfered portion 30 of the pin 24 and stops it from further rotation. The spring 22 takes up the shock of this engagement and brings the sleeve 17 to an abrupt stop.

Because of the relationship between the diameter 12 and 17 and the spring 18 and its direction of winding, the motor shaft can continue to rotate without winding up the spring by virtue of slippage between the spring 18 which continues to rotate with the shaft 12 and the sleeve 17 which is now stationary. The friction between the spring 18 and sleeve 17 will then bring the motor shaft to a full stop in five to ten seconds without putting any undue strain on the motor shaft, saw blade and associated elements.

By virtue of the chamfered arrangement at 30, it will be clear that so long as the motor is slowing down a clockwise pressure is maintained between the finger 23 and the chamfer 30. As soon as the motor shaft stops, this pressure is released and the spring 25 can then return the pin 24 to its reset position where the ball detent 28 engages the neck 27. It will be observed that the operator needs only initiate the action by pressing on the knob 40. He need not hold the knob down until the motor stops.

It will be clear that modifications may be made without departing from the spirit of the invention. Thus it is broadly within the scope of the invention to provide a solenoid actuated plunger to stop rotation of the sleeve. Therefore no limitation is intended which is not set forth in the claims.

The embodiments of the invention in which an exclusive property or privilege is claimed are defined as follows:

1. In combination with an electric motor having a shaft, a brake comprising:
    (a) a sleeve rotatably mounted on said shaft;
    (b) one way clutch means coupling said shaft and sleeve together during energized rotation of said shaft, and exerting braking friction when said motor is deenergized and said sleeve is prevented from rotation;
    (c) means for stopping rotation of said sleeve;
    (d) whereby the deenergized motor is braked rapidly but not abruptly.

2. The structure of claim 1, wherein the means for stopping rotation of said sleeve is provided with shock absorbing means.

3. In combination with an electric motor having a shaft, said shaft having a portion of reduced diameter, a spring brake comprising:
    (a) a sleeve rotatably mounted on said portion of reduced diameter and having an outside diameter slightly less than that of said shaft;
    (b) a flat helical spring embracing adjacent portions of said shaft and said sleeve and being wound in a sense opposite to the direction of rotation of said shaft, and being wound to a diameter smaller than the diameter of said shaft and said sleeve whereby it firmly clamps said shaft and sleeve together;
    (c) a circular spring secured at one end to said sleeve and embracing said sleeve circumferentially in the direction of rotation of said shaft, and having a free end provided with a stop finger;
    (d) said shaft, helical spring, sleeve and circular spring all rotating together as a unit during energized rotation of said shaft;
    (e) means for engaging said stop finger to stop rotation of said sleeve, whereby when said motor is deenergized, the relative rotation between said helical spring and sleeve tends to unwind said helical spring, thereby permitting continued relative rotation of said shaft accompanied by rapid deceleration thereof by virtue of the braking friction produced between said helical spring and said sleeve.

4. The apparatus of claim 3, wherein the means for engaging said stop finger to stop rotation of said sleeve comprises:
    (a) a manually actuable plunger having a stop-finger-engaging end portion;
    (b) spring biased detent means to engage said plunger;
    (c) said plunger being movable radially into stop-finger-engaging position; and
    (d) a return spring for returning said plunger to its inactive position.

5. The apparatus of claim 4, wherein said stop-finger-engaging end portion has a reverse chamfer whereby to hold said plunger in its operative position throughout the braking cycle by engagement of stod stop finger over said chamfer.

6. Apparatus according to claim 4, wherein the relationship between the spring bias of said detent means and the bias of said return spring is such that at the instant the bias of said detent means is overcome, an unbalanced force exists on said plunger of sufficient magnitude to move the stop-finger-engaging portion of said plunger into the path of said stop finger in a length of time significantly less than that required for said shaft to make one revolution.

References Cited

UNITED STATES PATENTS

| | | | |
|---|---|---|---|
| 2,096,458 | 10/1937 | Johnson | 310—37 |
| 2,119,986 | 6/1938 | Dremel | 310—77 |
| 2,735,029 | 2/1956 | Dyer | 310—77 |
| 3,038,109 | 6/1962 | Mowery | 310—77 |

WARREN E. RAY, *Primary Examiner.*

R. SKUDY, *Assistant Examiner.*